US012810092B2

(12) United States Patent
Sato

(10) Patent No.: US 12,810,092 B2
(45) Date of Patent: Nov. 24, 2026

(54) INFORMATION PROCESSING APPARATUS, METHOD FOR CONTROLLING INFORMATION PROCESSING APPARATUS, AND STORAGE MEDIUM

(71) Applicant: CANON KABUSHIKI KAISHA, Tokyo (JP)

(72) Inventor: Haruki Sato, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 19/389,477

(22) Filed: Nov. 14, 2025

(65) Prior Publication Data

US 2026/0141196 A1 May 21, 2026

(30) Foreign Application Priority Data

Nov. 19, 2024 (JP) ................................ 2024-201600

(51) Int. Cl.
*G06K 7/14* (2006.01)

(52) U.S. Cl.
CPC ......... *G06K 7/1417* (2013.01); *G06K 7/1413* (2013.01)

(58) Field of Classification Search
CPC ........................... G06K 7/1417; G06K 7/1413
USPC ...................................................... 235/462.1
See application file for complete search history.

(56) References Cited

U.S. PATENT DOCUMENTS

| | | | | |
|---|---|---|---|---|
| 11,087,310 B2* | 8/2021 | Jain | G06Q 20/405 |
| 2012/0211561 A1* | 8/2012 | Lieberman | G06Q 90/00 235/494 |
| 2013/0317835 A1* | 11/2013 | Mathew | G06Q 10/10 705/40 |
| 2014/0067619 A1* | 3/2014 | Heimbach | B42D 1/00 705/26.81 |
| 2022/0180138 A1* | 6/2022 | Aruga | G06K 19/06037 |

FOREIGN PATENT DOCUMENTS

JP 2022091577 A 6/2022

* cited by examiner

*Primary Examiner* — Daniel A Hess
(74) *Attorney, Agent, or Firm* — ROSSI, KIMMS & McDOWELL LLP

(57) ABSTRACT

An information processing apparatus is an information processing apparatus capable of communicating with an external apparatus managing registration information on form issuers, which includes an image obtaining unit that obtains a form image including a binary code corresponding to form identification information for identifying the form, an analyzing unit that analyzes the binary code included in the obtained form image, a registration information obtaining unit that obtains, from the external apparatus, the registration information associated with the form identification information obtained by analyzing the binary code, and a display control unit that displays, on a display unit, the form identification information and the registration information.

10 Claims, 10 Drawing Sheets

INFORMATION PROCESSING APPARATUS, METHOD FOR CONTROLLING INFORMATION PROCESSING APPARATUS, AND STORAGE MEDIUM

BACKGROUND

Field of the Technology

The present disclosure relates to an information processing apparatus, a method for controlling an information processing apparatus, and a storage medium.

Description of the Related Art

A known technique involves reading a form, such as an invoice, with an image reading apparatus. Character recognition, such as the optical character recognition (OCR), is then performed on the resulting form image to extract a character string, which is automatically entered into a system's input field.

It is difficult to obtain character strings described on a form at high accuracy because formats of forms vary depending on issuers or accuracy of character recognition is not high, and its improvement is being considered.

Concerning a technique for obtaining character strings described on a form, Japanese Patent Laid-Open No. 2022-091577 discloses a technique for reading form identification information that specifies a form from an embedded code included in form image data, and obtaining form information retained in association with the read form identification information.

SUMMARY

An information processing apparatus according to an aspect of the present disclosure is an information processing apparatus capable of communicating with an external apparatus managing registration information on form issuers, which includes at least one memory that stores instructions; and at least one processor that executes the instructions to: obtain a form image including a binary code corresponding to form identification information for identifying the form; analyze the binary code included in the obtained form image; obtain, from the external apparatus, the registration information associated with the form identification information obtained by analyzing the binary code; and display, on a display unit, the form identification information and the registration information.

Features of the present disclosure will become apparent from the following description of embodiments with reference to the attached drawings. The following description of embodiments is described by way of example.

DESCRIPTION OF THE EMBODIMENTS

Modes for carrying out the technique of the present disclosure will be described below in detail with reference to the drawings. It is to be noted that the following embodiments are not intended to limit the technique of the present disclosure according to the appended claims. The entire combination of characteristics described in each embodiment is not always essential for a solution of the technique of the present disclosure. Meanwhile, the characteristics may arbitrarily be combined. The same constituents will be explained by being denoted by the same reference signs.

First Embodiment

<System Configuration>

Figure 1:
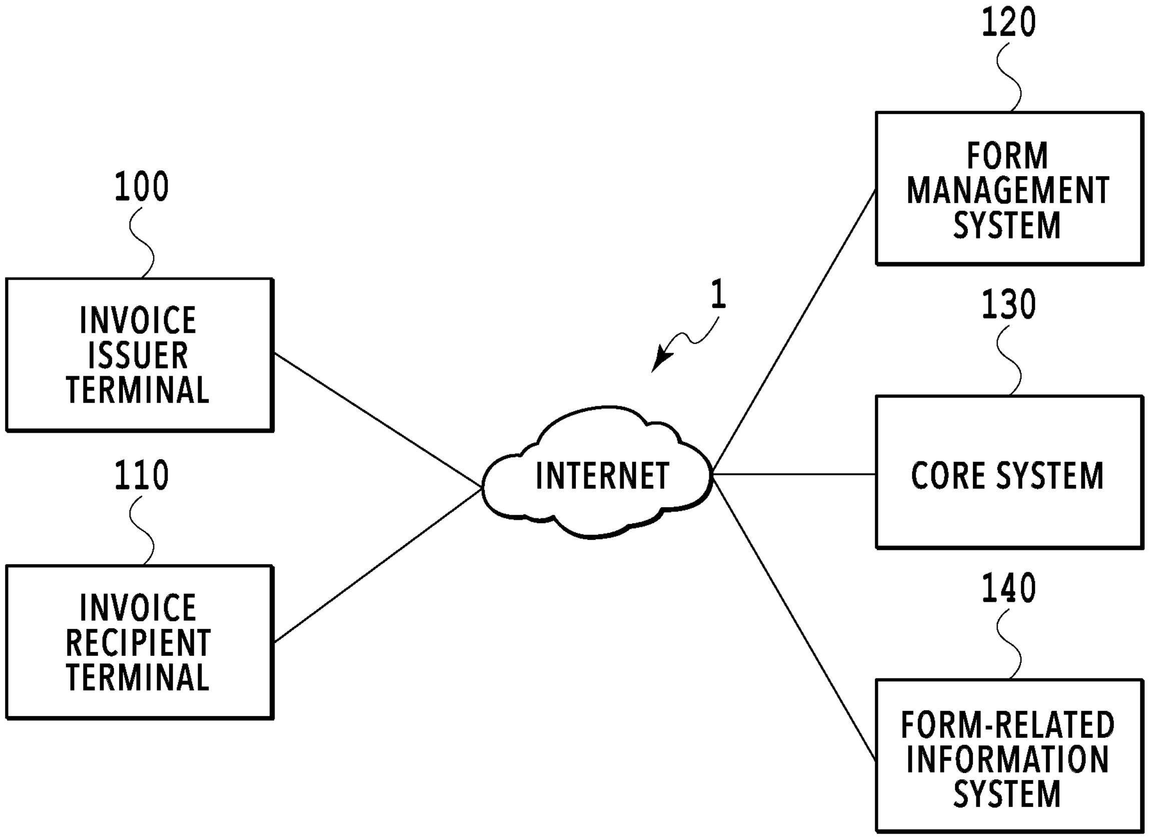
FIG. 1 is a diagram showing the entirety of an information processing system.

FIG. 1 is a diagram showing a configuration example of the entirety of an information processing system according to the present embodiment. An information processing system 1 of the present embodiment includes an invoice issuer terminal 100, an invoice recipient terminal 110, a form management system 120, a core system 130, and a form-related information system 140. The invoice issuer terminal 100, the invoice recipient terminal 110, the form management system 120, the core system 130, and the form-related information system 140 can communicate with one another via the Internet. The invoice issuer terminal 100 and the invoice recipient terminal 110 are each a terminal such as a smartphone. The form management system 120, the core system 130, and the form-related information system 140 are each a server computer provided with a Web server and a database.

In the information processing system 1 of the present embodiment, the invoice issuer terminal 100 is connected to the form management system 120 via the Internet so as to input form information that represents contents of a form. Here, a registration number issued by carrying out user registration with the form-related information system 140 in advance is included in the form information. The form management system 120 generates and outputs form image data including the inputted form information. In this instance, the form management system 120 generates an embedded code indicating form identification information for specifying the form, and causes the form image data to contain the generated embedded code.

Next, in a case where the invoice recipient terminal 110 reads the form image data, the invoice recipient terminal 110 automatically identifies the embedded code that is present in the form image data, and extracts the embedded form identification information. Then, the invoice recipient terminal 110 transmits the extracted form identification information to the form management system 120. Upon receipt of the form identification information, the form management system 120 refers to a database (not shown) by using the received form identification information, thereby obtaining the form information inputted by using the invoice issuer terminal 100. Here, the invoice recipient terminal 110 extracts the form identification information from the embedded code, and transmits the form identification information to the form management system 120 in the present embodiment. However, the present disclosure is not limited to this configuration. For example, the invoice recipient terminal 110 may carry out only the processing to read the form image data and to transmit the form image data to the form management system 120, while extraction of the form identification information from the embedded code in the form image data may be carried out by the form management system 120.

Thereafter, the form management system 120 transmits the registration number included in the form information to the form-related information system 140. Here, the registration number is information for identifying a form issuer, which is identification information corresponding to the form issuer. The form-related information system 140 refers to the not-illustrated database by using the received registration number, obtains form-related information that is related to the form and linked to the registration number, and returns the form-related information to the form management system 120. Here, the form-related information can also be referred to as identification-related information because it is the information related to the form issuer. The form management system 120 creates a form information screen by using the form-related information obtained from the form-related information system 140, the form information obtained from the database in the form management system 120, and the form image data received from the invoice recipient terminal 110. Then, the form management system 120 displays the created form information screen on a not-illustrated display device on the invoice recipient terminal 110. A user who operates the invoice recipient terminal 110 finishes the form by operating the displayed form information screen. Though the finished form is stored in the form management system 120, the form may further be transmitted to the core system 130 and used in different processing.

As described above, in the form management system 120 of the present embodiment, the embedded code indicating the form identification information for specifying the form is generated in the case of issuing the form and is embedded in the form image data. Then, the user at an invoice recipient that has received the form reads the form image data by using the invoice recipient terminal 110, obtains the form identification information from the embedded code, and transmits the form identification information to the form management system 120. The form management system 120 obtains the form information from the form identification information and obtains the registration information included in the form information. Then, the form management system 120 obtains the form-related information by transmitting the registration information to the form-related information system 140, and displays a form screen on the invoice recipient terminal 110 by using these pieces of the information.

For this reason, according to the present embodiment, it is possible to obtain the form information itself without carrying out character recognition on the form image data inputted from a form-recipient side. In addition, information not included in the form management system 120 is obtained from the external form-related information system 140 by using the registration information included in the form information. In this way, the user of the invoice recipient terminal 110 can create the form on the form screen displayed on the invoice recipient terminal 110 without referring to the external information by himself or herself.

In the present embodiment, an invoice being one type of forms will be described as an example. First, an invoice issuer being the form issuer is a business operator who conducts transactions with various clients. The invoice issuer may be either an individual or an organization such as a company and a corporation. The invoice issuer will be hereinafter referred to as a business operator A. On the other hand, an invoice recipient of the invoice being a form recipient is a client of the business operator A. The client will be hereinafter referred to as a business operator B.

First, the business operator A performs qualified business operator registration with the form-related information system 140 prior to the use of the form management system 120. The form-related information system 140 is a management system for the National Tax Agency Invoice System. In a case where the business operator A goes through procedures of registration application for a qualified invoice issuer with the form-related information system 140 and gets registered as the qualified invoice issuer after going through a review, the registration information will be released in public. In the case of the registration, a name of the qualified invoice issuer, a qualified business operator number (a registration number), a business operator processing category, and registration date are also linked to the registration. This registration with the form-related information system 140 may be carried out via the Internet by using the invoice issuer terminal 100 and the like, or may be carried out in the form of application by paper while visiting a tax office. Likewise, a method of notifying the business operator A of the qualified business operator number issued from the form-related information system 140 may adopt an Internet medium such as an electronic mail or delivery in writing either by postal mail or at a tax office counter.

Next, the business operator A accesses the form management system 120 by using the invoice issuer terminal 100 in order to conduct a transaction with the business operator B and to create an invoice to the business operator B. A person in charge at the business operator A inputs the qualified business operator number issued by the form-related information system 140 to the form management system 120 together with invoice information necessary for creating a general invoice such as contents of invoice to the business operator B, bank account details for remittance, and due date for remittance. The form management system 120 stores the inputted contents in the not-illustrated database and issues an invoice management number. Then, in the case of issuing the invoice to the person in charge at the business operator A, the form management system 120 creates a QR code (registered trademark) being a binary code obtained by encoding the invoice management number, and attaches the QR code to a blank space in an invoice image. Here, the invoice may be either a paper medium to be outputted from a not-illustrated printing apparatus or an electronic medium such as Portable Document Format (PDF). The binary code is not limited to the QR code and may be a barcode obtained by encoding the invoice management number.

Next, the person in charge at the business operator A sends the created invoice to the business operator B. In the case where the invoice is the electronic medium, the invoice may be sent as an attachment to an electronic mail and the like, or may be printed out with the printing apparatus and sent as a paper medium by facsimile, postal mail, or hand delivery.

Upon receipt of the invoice, a person in charge at the business operator B accesses the form management system 120 by using the invoice recipient terminal 110 and registers the invoice. The invoice will be directly registered in the case where the invoice is the electronic medium. On the other hand, in the case where the invoice is the paper medium, the invoice will be registered after scanning the paper medium form by using a not-illustrated information reading apparatus and converting the form into a form image being an electronic medium.

The form management system 120 detects and analyzes the QR code on invoice data transmitted from the invoice recipient terminal 110, thus obtaining the invoice management number. Then, the form management system 120 obtains the invoice information and the qualified business operator number by referring to the not-illustrated database based on the invoice management number. Next, the form management system 120 accesses the form-related information system 140 to transmit the qualified business operator number. Hence, the form-related information system 140 returns qualified business operator information such as the name of the business operator and a status of the qualified business operator registration.

The form management system 120 creates form processing screen data based on the image data of the invoice, the invoice information obtained from the database, and the qualified business operator information obtained from the form-related information system 140, and transmits the generated form processing screen data to the invoice recipient terminal 110.

The person in charge at the business operator B carries out invoice processing by operating a form processing screen displayed on the invoice recipient terminal 110. Specifically, this person in charge confirms whether or not the contents described on the invoice are appropriate in compensation for contents of the transaction with the business operator A. In the case where the contents are appropriate, this person in charge instructs the form management system 120 to conduct payment processing to the core system 130.

<Hardware Configuration of Invoice Issuer Terminal>

Figure 2:
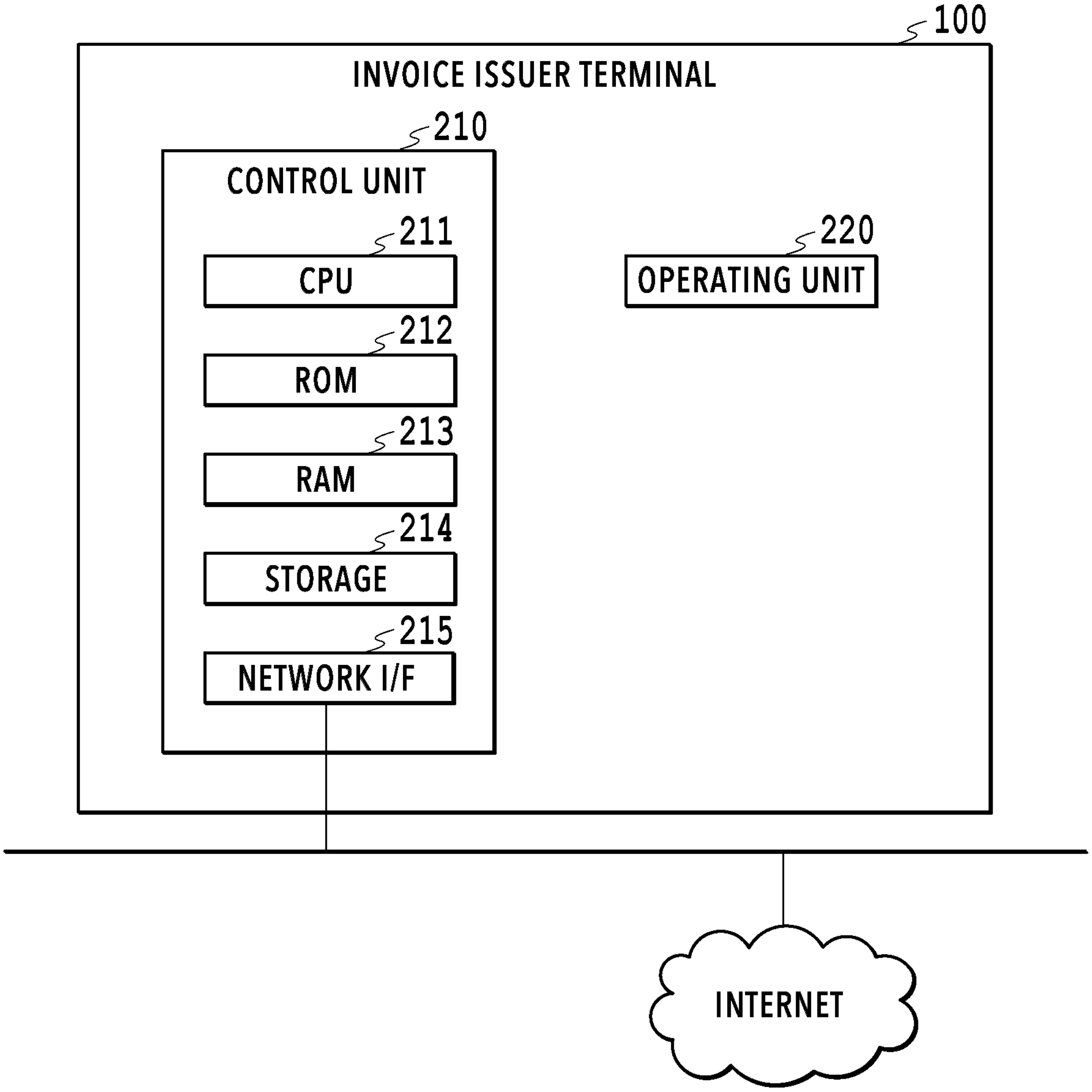
FIG. 2 is a diagram showing a hardware configuration example of an invoice issuer terminal.

FIG. 2 is a diagram showing a hardware configuration of the invoice issuer terminal 100. Note that a hardware configuration of the invoice recipient terminal 110 has the same hardware configuration as that of the invoice issuer terminal 100 shown in FIG. 2. The invoice issuer terminal 100 includes a control unit 210 and an operating unit 220.

The control unit 210 includes the following units 211 to 215, and controls an operation of the entire invoice issuer terminal 100. A CPU 211 reads out a control program stored in a ROM 212 and executes a variety of processing, thereby controlling the operation of the entire invoice issuer terminal 100. A RAM 213 is used as a temporary storage area such as a main memory and a work area for the CPU 211. Here, the present embodiment assumes the case in which the single CPU 211 executes each procedure of the processing indicated in a flowchart to be described later by using a single memory (the RAM 213 or a storage 214). Nonetheless, the present disclosure is not limited to this configuration. For example, each procedure of the processing may be executed by causing multiple CPUs and multiple RAMs or storages to cooperate. The storage 214 is a high-capacity storage unit to store image data and various programs. A network I/F 215 is an interface that connects the invoice issuer terminal 100 to the Internet. The invoice issuer terminal 100 communicates with other apparatuses (cloud services including the form management system 120, the core system 130, the form-related information system 140, and the like) via the network I/F 215, thus transmitting and receiving a variety of information.

The operating unit 220 includes a touch panel which accepts an operation, an input, or an instruction by a user, and displays a screen corresponding to the operation, the input, or the instruction.

<Hardware Configuration of Form Management System>

Figure 3:
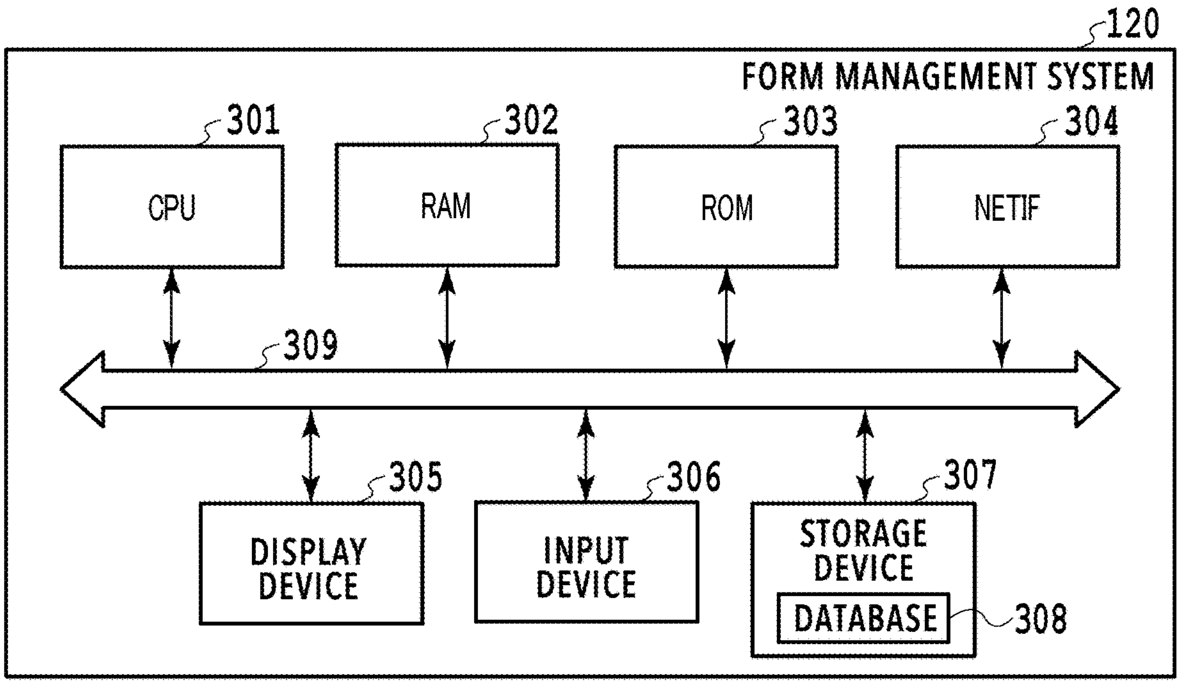
FIG. 3 is a diagram showing a hardware configuration example of a form management system.

FIG. 3 is a diagram showing a hardware configuration example of the form management system 120. Note that hardware configurations of the core system 130 and the form-related information system 140 have the same hardware configuration as that of the form management system 120 shown in FIG. 3.

The form management system 120 is an information processing apparatus which includes a CPU 301, a RAM 302, a ROM 303, a network interface 304, a display device 305, an input device 306, and a storage device 307. The form management system 120 further includes an input-output bus (serving as an address bus, a data bus, and a control bus) 309.

The CPU 301 is a central processing unit that governs the control of a computer system. Respective functional configurations and pieces of processing to be described later are implemented by causing the CPU 301 to execute computation and processing of information and control of respective hardware units based on a control program. The RAM 302 is a random access memory that functions as a main memory for the CPU 301, and as a work memory necessary for loading a program to be executed and for executing the program. The ROM 303 is a read-only memory that stores a control program to define operation processing procedures of the CPU 301. The ROM 303 includes a program ROM that stores an operating system (OS) being a system program for conducting device control of the computer system, and a data ROM that stores information necessary for activating the system. There is also a case of using the storage device 307 to be described later instead of the ROM 303. The network interface (hereinafter abbreviated as NETIF) 304 performs input-output control of data such as images to be transmitted and received via the network. The NETIF 304 has a role as a gateway of communication with external apparatuses such as the invoice issuer terminal 100 and the invoice recipient terminal 110. For example, the display device 305 is a CRT display unit, a liquid crystal display unit, or the like. The input device 306 is a device for accepting operating instructions from the user, which is a touch panel, a keyboard, a mouse, or the like. The storage device 307 is a device for storing programs to be executed by the CPU 301, a database 308, and a variety of information, which is a non-volatile storage device such as a magnetic disk and a flash memory. In a case of functioning as each of the systems, the database 308 retains information corresponding to the functioning system. Specifically, in a case of functioning as the form management system 120, the database 308 retains tables for managing the form information and the registration information. In a case of functioning as the core system 130, the database 308 retains multiple pieces of bank account information for remittance and information necessary for conducting procedures of remittance to the bank accounts. Meanwhile, the database 308 retains a table for managing the qualified business operator information including names of the business operators, statuses of qualified business operator registration, and the like in a case of functioning as the form-related information system 140. The input-output bus 309 connects the respective units in the form management system 120 and transmits the information.

<Software Configuration of the Information Processing System>

Figure 4:
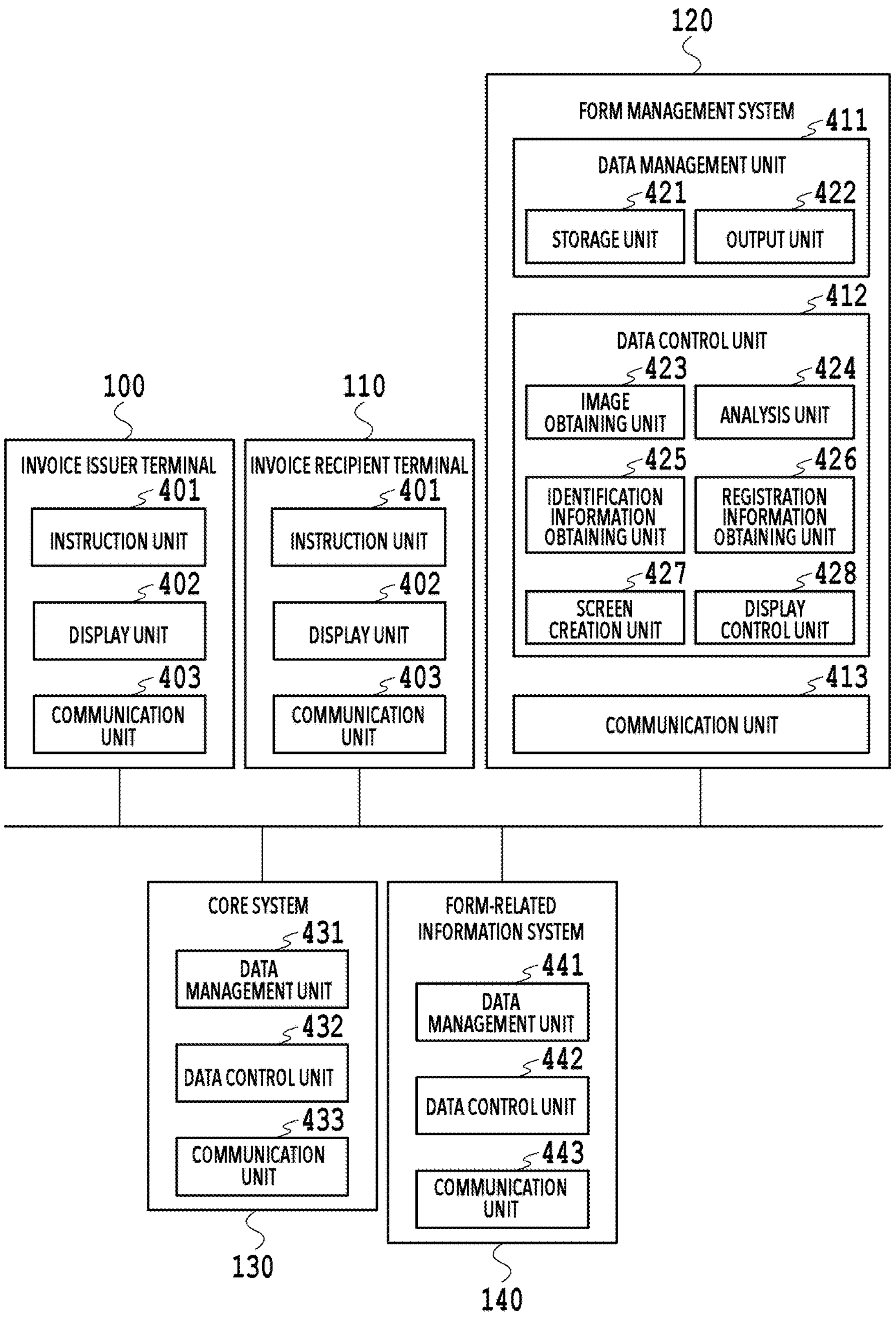
FIG. 4 is a diagram showing a functional configuration example of the information processing system.

FIG. 4 is a diagram showing a software configuration example of the information processing system 1. Here, the same constituents will be denoted by the same reference signs and explanations thereof will be omitted.

The invoice issuer terminal 100 includes an instruction unit 401, a display unit 402, and a communication unit 403. The instruction unit 401 is a touch device integrated with the display unit 402, and is configured to change contents or to instruct processing by operating information displayed on the display unit 402. The display unit 402 displays screen data obtained via the communication unit 403, and updates contents of a screen to be displayed in accordance with contents of an operation with the instruction unit 401 and on the data from the communication unit 403. The communication unit 403 transmits the contents inputted with the instruction unit 401 to the form management system 120, and transmits the form processing screen data returned in response thereto to the display unit 402.

The invoice recipient terminal 110 has the same configuration as that of the invoice issuer terminal 100 and a counterpart of the communication unit 403 thereof is the form management system 120 as the same as the case of the invoice issuer terminal 100. Hence, explanations of the invoice recipient terminal 110 will be omitted.

The form management system 120 includes a data management unit 411, a data control unit 412, and a communication unit 413.

The data management unit 411 includes a storage unit 421 and an output unit 422, and carries out output and update as well as new registration of form data retained inside in accordance with an instruction from the data control unit 412. The storage unit 421 stores information shown below out of the form information transmitted from the invoice issuer terminal 100 being a first terminal apparatus. Specifically, the storage unit 421 associates identification information on the invoice with identification information on the invoice issuer out of identification information on multiple users to be managed by the form-related information system 140 being the external apparatus while associating the identification information with registered member information indicating registered member names by which the respective users are registered, and stores the associated information. The output unit 422 outputs the identification information on the invoice issuer obtained by using an identification information obtaining unit 425 to the form-related information system 140, and outputs screen data (form management information) including the identification information on the invoice and the registration information to the invoice recipient terminal 110.

The data control unit 412 includes an image obtaining unit 423, an analysis unit 424, the identification information obtaining unit 425, a registration information obtaining unit 426, an screen creation unit 427, and a display control unit 428, and carries out the processing shown below. Specifically, the data control unit 412 sends the data management unit 411 an instruction based on contents instructed from the invoice issuer terminal 100 and the like via the communication unit 413, thus carrying out obtainment, update, and addition of the stored form information. Meanwhile, based on data or the instruction from the invoice issuer terminal 100 and the like, the data control unit 412 creates screen data to be displayed on the display unit 402, and transmits the screen data to the invoice issuer terminal 100 and the like via the communication unit 413.

The image obtaining unit 423 obtains the invoice image that includes the binary code obtained by encoding the identification information on the invoice, and the identification information on the invoice issuer. The analysis unit 424 obtains the identification information on the invoice by analyzing the binary code included in the invoice image. The identification information obtaining unit 425 obtains the identification information on the invoice issuer corresponding to the identification information on the invoice obtained as a consequence of the analysis by the analysis unit 424 by referring to the storage unit 421.

The registration information obtaining unit 426 obtains the registration information including the registered member information associated with the identification information on the invoice issuer obtained by the identification information obtaining unit 425 from the form-related information system 140 being the external system. The screen creation unit 427 creates screen data including the identification information on the invoice obtained by the analysis of the QR code and the registration information obtained from the form-related information system 140. The display control unit 428 causes the invoice recipient terminal 110 to display the screen data created by the screen creation unit 427.

The core system 130 has the same configuration as that of the form management system 120 but includes a data management unit 431, a data control unit 432, and a communication unit 433 which are different from the respective units 411 to 413 of the form management system 120. The data management unit 431 stores log-in information to a financial institution (not shown) in order to instruct payment processing to the financial institution and history information in the case of carrying out the payment processing. Meanwhile, the data control unit 432 reads the log-in information to the financial institution of payment from the data management unit in accordance with the contents of instruction of the payment processing from the form management system 120 via the communication unit 433, and carries out the payment processing to the not-illustrated financial institution via the communication unit 433. In a case where the payment processing is completed, the data control unit 432 sends the data management unit 431 an instruction to store the contents of payment.

The form-related information system 140 is an external apparatus that manages registration information concerning the issuer of the form, which is registration information including registration status information indicating a registration status. The form-related information system 140 has the same configuration as that of the form management system 120 but includes a data management unit 441, a data control unit 442, and a communication unit 443 which are different from the respective units 411 to 413 of the form management system 120.

The data management unit 441 stores the qualified business operator number issued upon acceptance of application from each business operator, the name of the business operator, the registration status, and the like, and carries out addition, update, and deletion of the contents in accordance with an instruction from the data control unit 442. The data control unit 442 obtains the qualified business operator number, the name of the business operator, and the registration status with reference to the data management unit 441 via the communication unit 443 and in accordance with an instruction from the form management system 120, and returns those pieces of information. Meanwhile, in a case where a person in charge at a tax office inputs the registration information on the business operator to be registered as the qualified business operator by using an input unit (not shown), the data control unit 442 registers those pieces of information with the data management unit 441.

<Sequence by Information Processing System>

Figure 5:
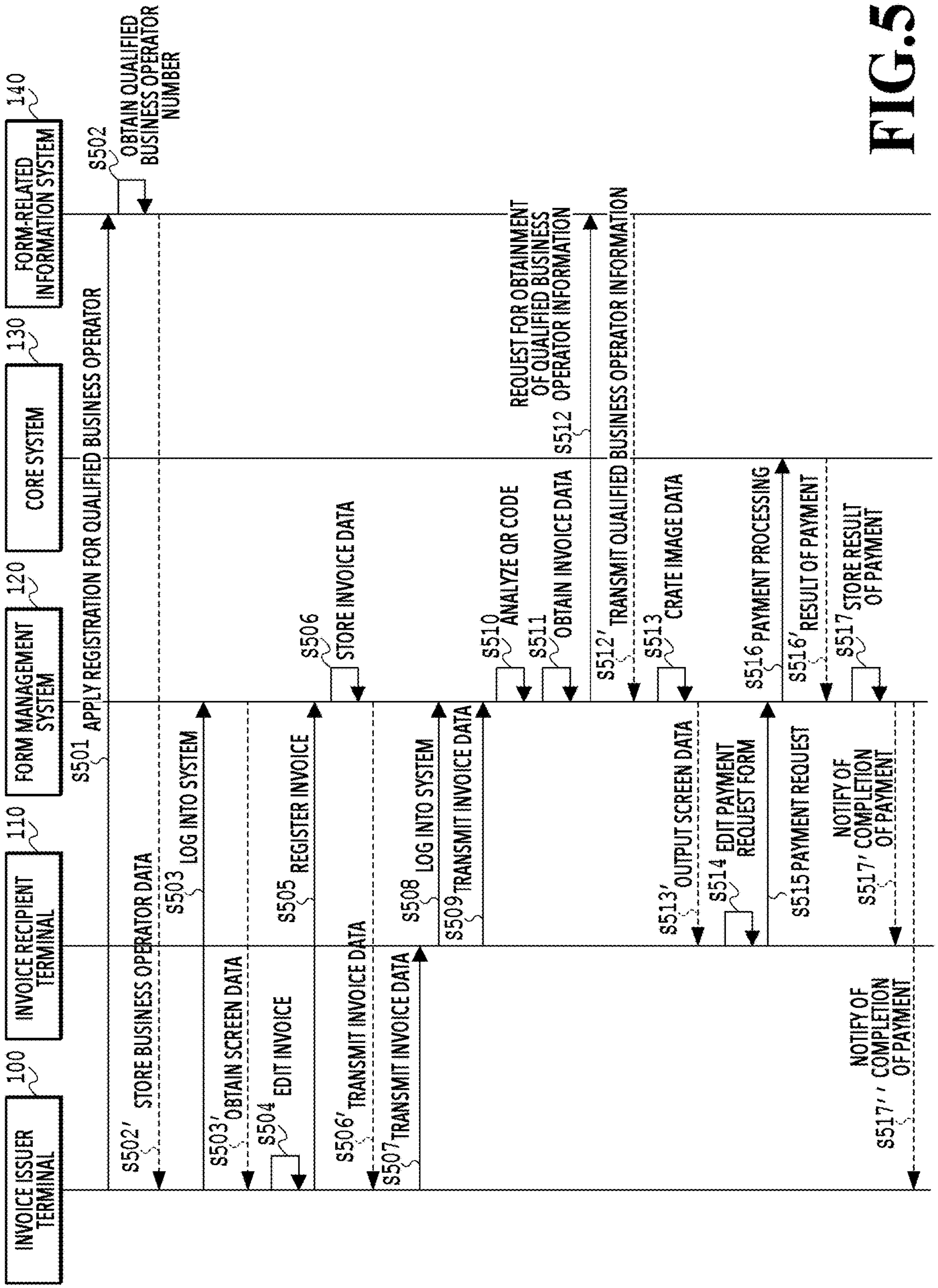
FIG. 5 is a diagram showing a sequence by the information processing system.

FIG. 5 is a diagram showing a sequence by the information processing system according to the present embodiment. A sign "S" attached to an explanation of each procedure of processing represents a step in the sequence. Here, exchanges among the respective apparatuses will mainly be described.

In S501, the person in charge at the business operator A accesses the form-related information system 140 by operating the invoice issuer terminal 100, and carries out registration application for the qualified business operator. In S502, upon acceptance of the registration application in S501, the form-related information system 140 examines contents of the application, issues the qualified business operator number in the case of obtaining a result of examination that the contents of the application have no problem, and stores the issued qualified business operator number with the data management unit 441 as business operator data. In this way, the issued qualified business operator number is registered. In S502', the invoice issuer terminal 100 obtains the qualified business operator number transmitted from the form-related information system 140. Thus, the business operator A will recognize the qualified business operator number being the registration number representing the registration of the business operator A as the qualified invoice issuer (hereinafter referred to as the qualified business operator).

Next, the person in charge at the business operator A enters into a contract for an operation and the like with the business operator B, and calculates a billing amount in compensation for the operation. In S503, the person in charge at the business operator A logs into form management system 120 by operating the invoice issuer terminal 100. Then, the person in charge at the business operator A performs an operation to request creation of an invoice. In S503', the invoice issuer terminal 100 obtains screen data for creating the invoice (screen data for invoice creation), which is image data transmitted from the form management system 120.

In S504, the invoice issuer terminal 100 displays an invoice creation screen 600 as an input screen based on the screen data for invoice creation obtained in S503'. Then, the invoice issuer terminal 100 accepts input by the user operation of the person in charge at the business operator A for editing the invoice data by way of creation, correction, confirmation and the like via the displayed invoice creation screen 600. Besides a business operator name, items, amounts, and bank account details for remittance to be described in a general invoice, the invoice data also include the qualified business operator number issued in S502.

<Invoice Generation Screen>

Figure 6:
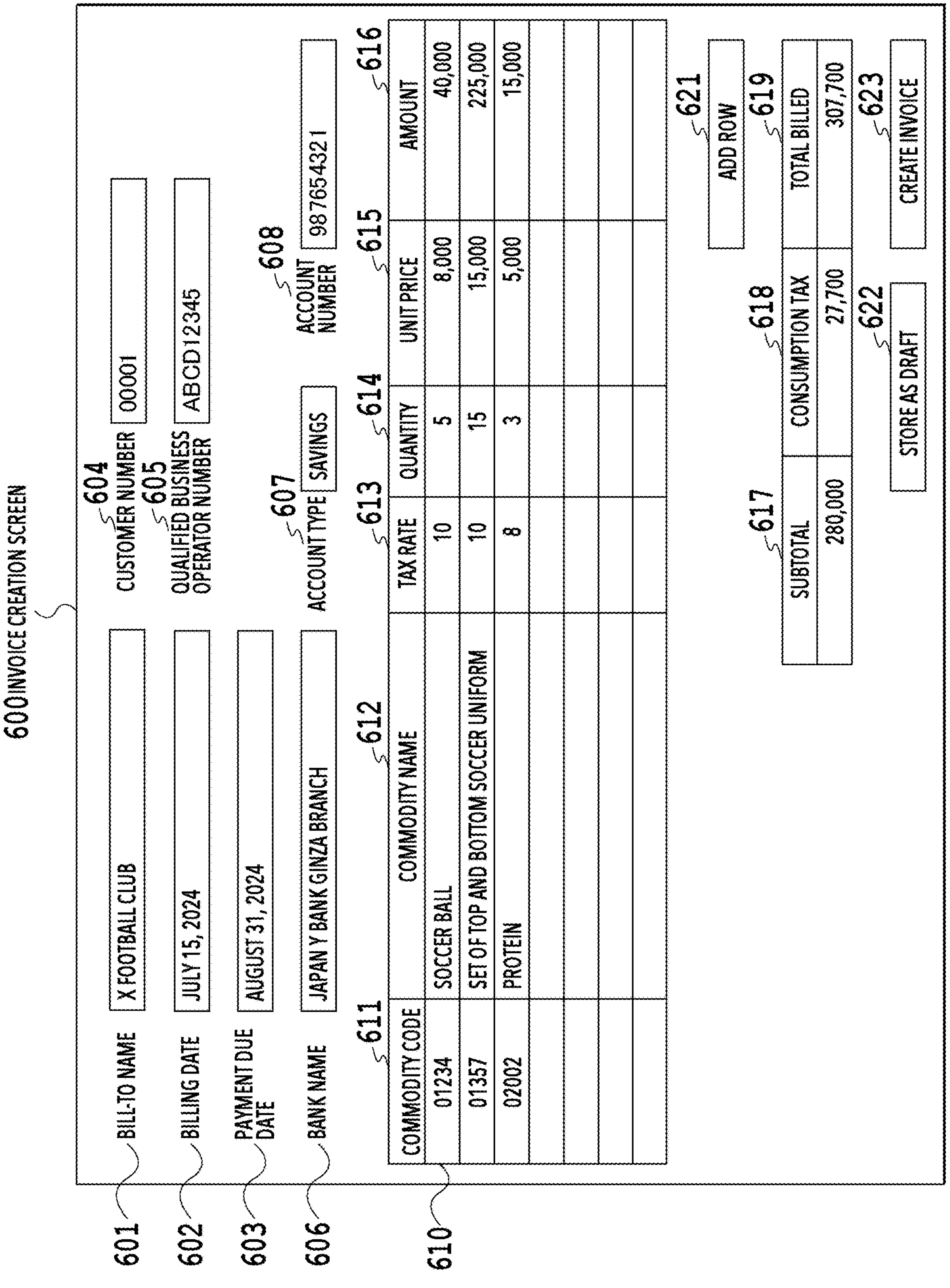
FIG. 6 is a schematic diagram showing an invoice creation screen.

FIG. 6 is a diagram showing an example of the invoice creation screen. The invoice creation screen 600 is a UI screen that accepts editing such as input and deletion by the user operation. The invoice creation screen 600 includes a bill-to name 601, a billing date 602, a payment due date 603, a customer number 604, a qualified business operator number 605, a bank name 606, an account type 607, an account number 608, and a breakdown 610. The breakdown 610 includes a commodity code 611, a commodity name 612, a tax rate 613, a quantity 614, a unit price 615, and an amount 616. The invoice creation screen 600 includes a subtotal 617, a consumption tax 618, and a total billed 619. Here, the invoice creation screen 600 is also deemed to include form management information containing identification information corresponding to the form issuer and identification-related information concerning the form issuer.

The invoice creation screen 600 further includes an "add row" button 621, a "store as draft" button 622, and a "create invoice" button 623. In a case where the "add row" button 621 is pressed by the user operation, a row for inputting a commodity code, a commodity name, a tax rate, a unit price, and an amount will be newly added to the breakdown 610. In a case where the "store as draft" button 622 is pressed by the user operation, the information inputted to the invoice creation screen 600 is stored as a draft in the invoice issuer terminal 100 or the like. In a case where the "create invoice" button 623 is pressed by the user operation, the invoice data is created based on the information inputted to the invoice creation screen 600, and processing to register the created invoice data is executed.

In S505, the person in charge at the business operator A issues a request to the form management system 120 for registration of the invoice data and creation of the invoice by pressing the "create invoice" button 623 on the invoice creation screen 600. Upon receipt of the registration request in S506, the form management system 120 issues the invoice management number for specifying the invoice, and stores the invoice management number in the data management unit 411 together with the transmitted invoice data.

In S506', the form management system 120 creates an invoice image 700 and transmits the invoice data to the invoice issuer terminal 100. Here, the form management system 120 is also deemed to return the invoice data in response to S505. A QR code image obtained by converting the invoice management number into the QR code is additionally provided to a blank space of the invoice image 700 in a predetermined format.

<Invoice Image>

Figure 7:
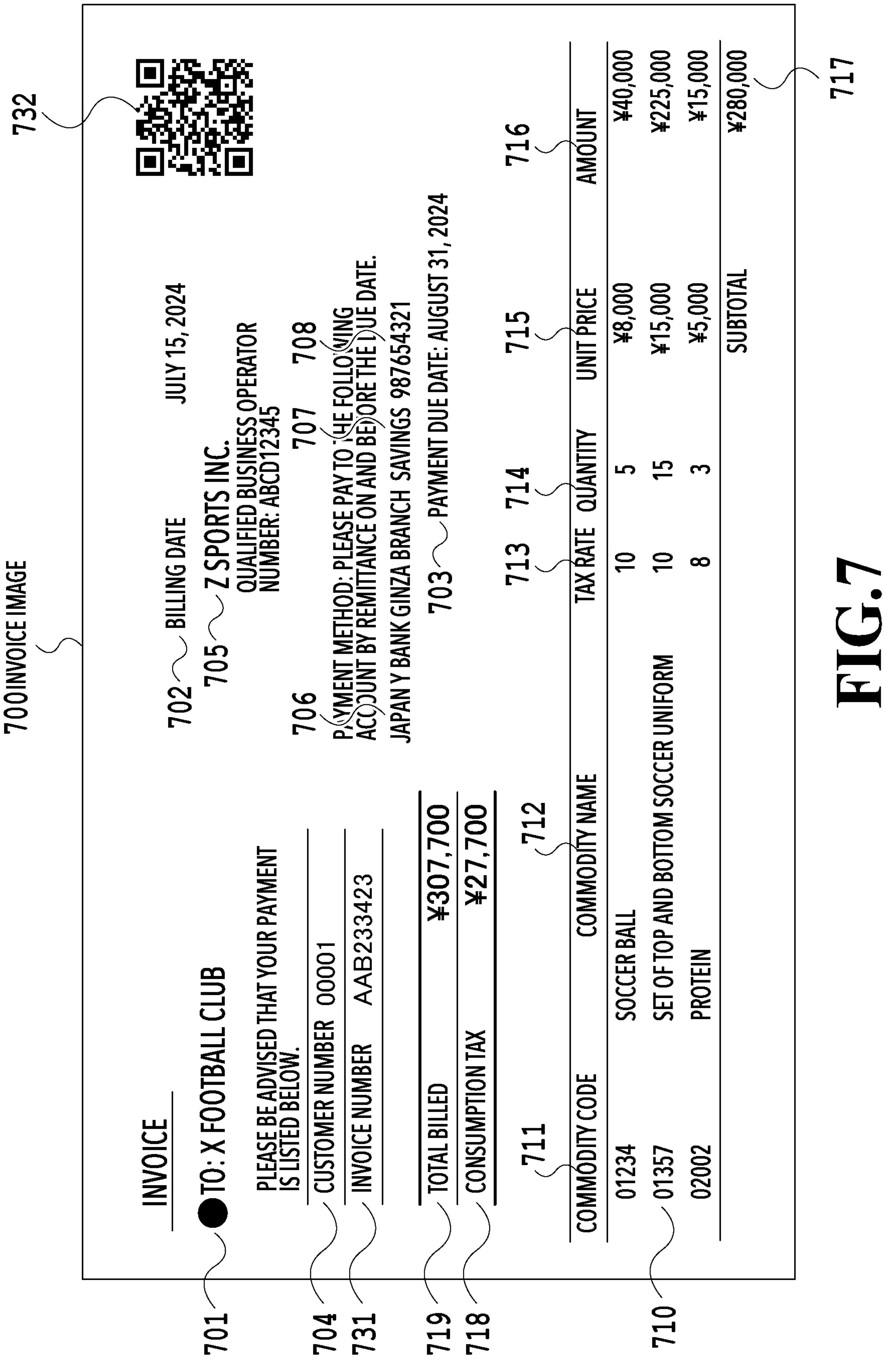
FIG. 7 is a schematic diagram showing an invoice image.

FIG. 7 is a diagram showing an example of the invoice image. The invoice image 700 is assumed to be a bitmap image. However, the present disclosure is not limited to this configuration. For example, the invoice image 700 may adopt a format such as the Portable Document Format (PDF), in which texts are embedded in an image. The invoice image 700 includes information inputted by way of the invoice creation screen 600 and information generated by the form management system 120. Specifically, the information inputted by way of the invoice creation screen 600 includes a bill-to name 701, a billing date 702, a payment due date 703, a customer number 704, a qualified business operator number 705, a bank name 706, an account type 707, an account number 708, and a breakdown 710. The breakdown 710 includes a commodity code 711, a commodity name 712, a tax rate 713, a quantity 714, a unit price 715, and an amount 716. The information inputted by way of the invoice creation screen 600 includes a subtotal 717, a consumption tax 718, and a total billed 719. The information generated by the form management system 120 includes an invoice number 731, and an embedded code 732 in which the invoice number is embedded.

In S507, the person in charge at the business operator A sends the received invoice image 700 in the form of a printed copy or electronic data to the person in charge at the business operator B. Here, the sending method may be either preset or set each time.

In S508, the person in charge at the business operator B logs into the form management system 120 by operating the invoice recipient terminal 110. Then, in S509, the person in charge at the business operator B transmits the invoice image 700 to the form management system 120 by operating the invoice recipient terminal 110. Here, in the case where the invoice image 700 is received as the electronic data, the person in charge at the business operator B transmits the electronic data directly to the form management system 120. Meanwhile, in the case where the invoice image 700 is received as the printed copy (the paper medium), the person in charge at the business operator B sends the form management system 120 a scanned image of the form that is converted into the electronic data by using a not-illustrated scanning apparatus and the like.

In S510, the form management system 120 analyzes the received invoice image 700. In a case where the QR code is detected, the form management system 120 reads out and obtains the invoice management number embedded in the detected QR code. Here, in a case where information other than the invoice management number is embedded in the QR code, OCR processing is performed on the entire invoice image 700 to extract contents (a character string) stated in the invoice from an OCR result and treat it as original data of payment request data. However, an explanation thereof will be omitted in the present embodiment.

In S511, the form management system 120 refers to the data management unit 411 and obtains the invoice data stored in S506, which is linked to the invoice management number obtained in S510. In S512, the form management system 120 sends the form-related information system 140 the qualified business operator number included in the invoice data. Then, in S512', the form-related information system 140 transmits the qualified business operator information linked to the qualified business operator number to the form management system 120. Accordingly, the form management system 120 obtains the qualified business operator information linked to the qualified business operator number from the form-related information system 140. In S513, the form management system 120 creates a journal entry screen 800 by using the invoice data obtained in S511 and the qualified business operator information obtained in S512'. In S513', the form management system 120 transmits the journal entry screen 800 created in S513 to the invoice recipient terminal 110.

<Journal Entry Screen>

Figure 8:
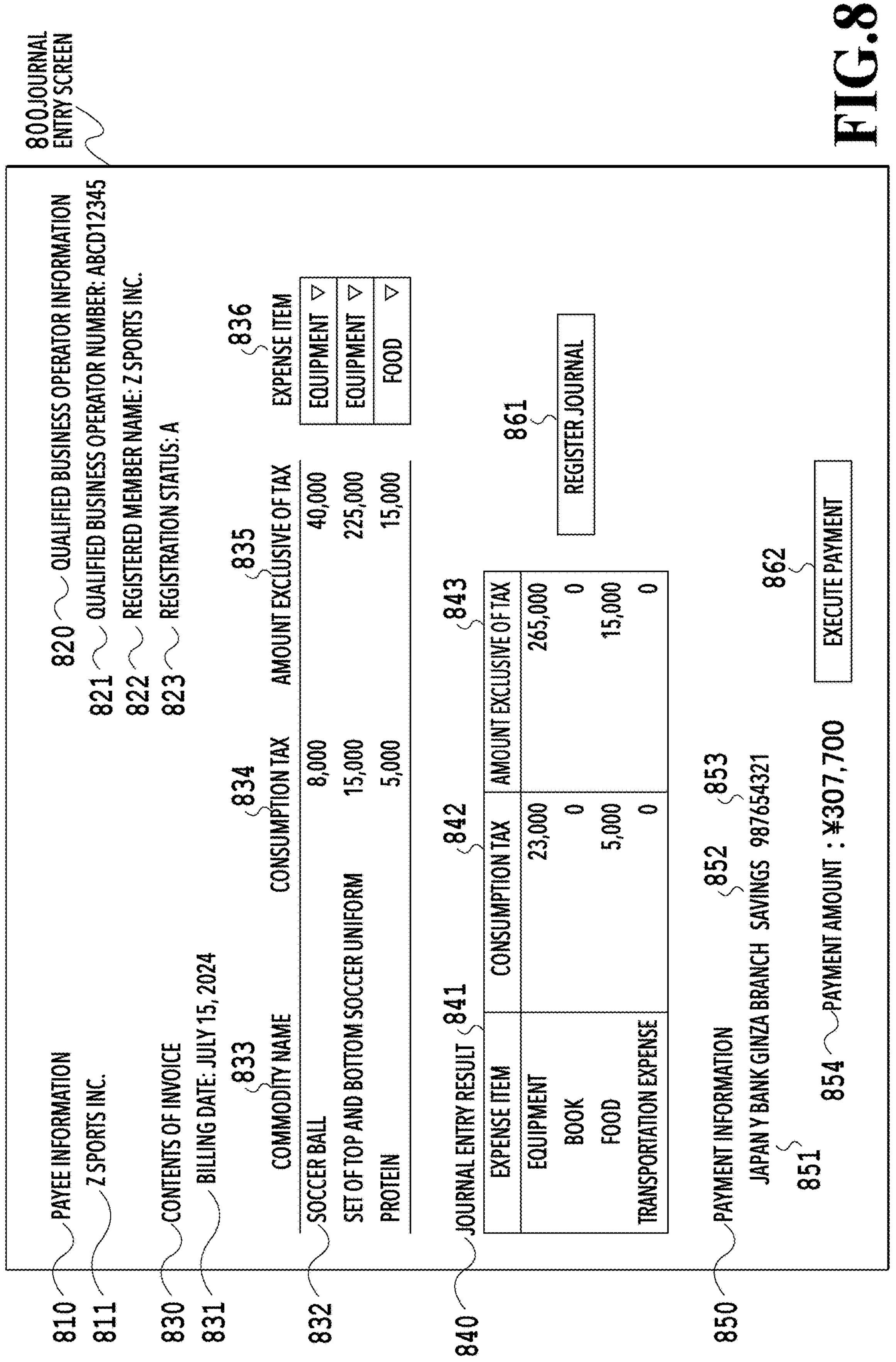
FIG. 8 is a schematic diagram showing a journal entry screen.

FIG. 8 is a diagram showing an example of the journal entry screen. The journal entry screen 800 includes payee information 810, qualified business operator information 820, contents of invoice 830, a journal entry result 840, payment information 850, a "register journal" button 861, and an "execute payment" button 862. Here, concerning expense items, there is provided a pull-down menu that enables selection regarding details of expense item names corresponding to commodity names. The payee information 810 includes a payee name 811. The qualified business operator information 820 includes a qualified business operator number 821, a registered member name 822, and a registration status 823. The contents of invoice 830 include a billing date 831 and a breakdown 832. The breakdown 832 includes a commodity name 833, a consumption tax 834, an amount exclusive of tax 835, and an expense item 836. The expense item 836 is in the form of a pull-down menu, which enables selection of one of options. Here, in FIG. 8, equipment is selected and displayed for a "soccer ball" and a "set of top and bottom soccer uniform", while food is selected and displayed for "protein". The journal entry result 840 includes an expense item 841, a consumption tax 842, and an amount exclusive of tax 843. The payment information 850 includes a bank name 851, an account type 852, an account number 853, and a payment amount 854. The "register journal" button 861 executes a request to journalize the information on the invoice contents and to register the journal entry results. In a case where the "execute payment" button 862 is pressed by the user operation, a request to the form management system 120 for the payment processing is executed.

<Display Processing of Registration Status>

Figure 9:
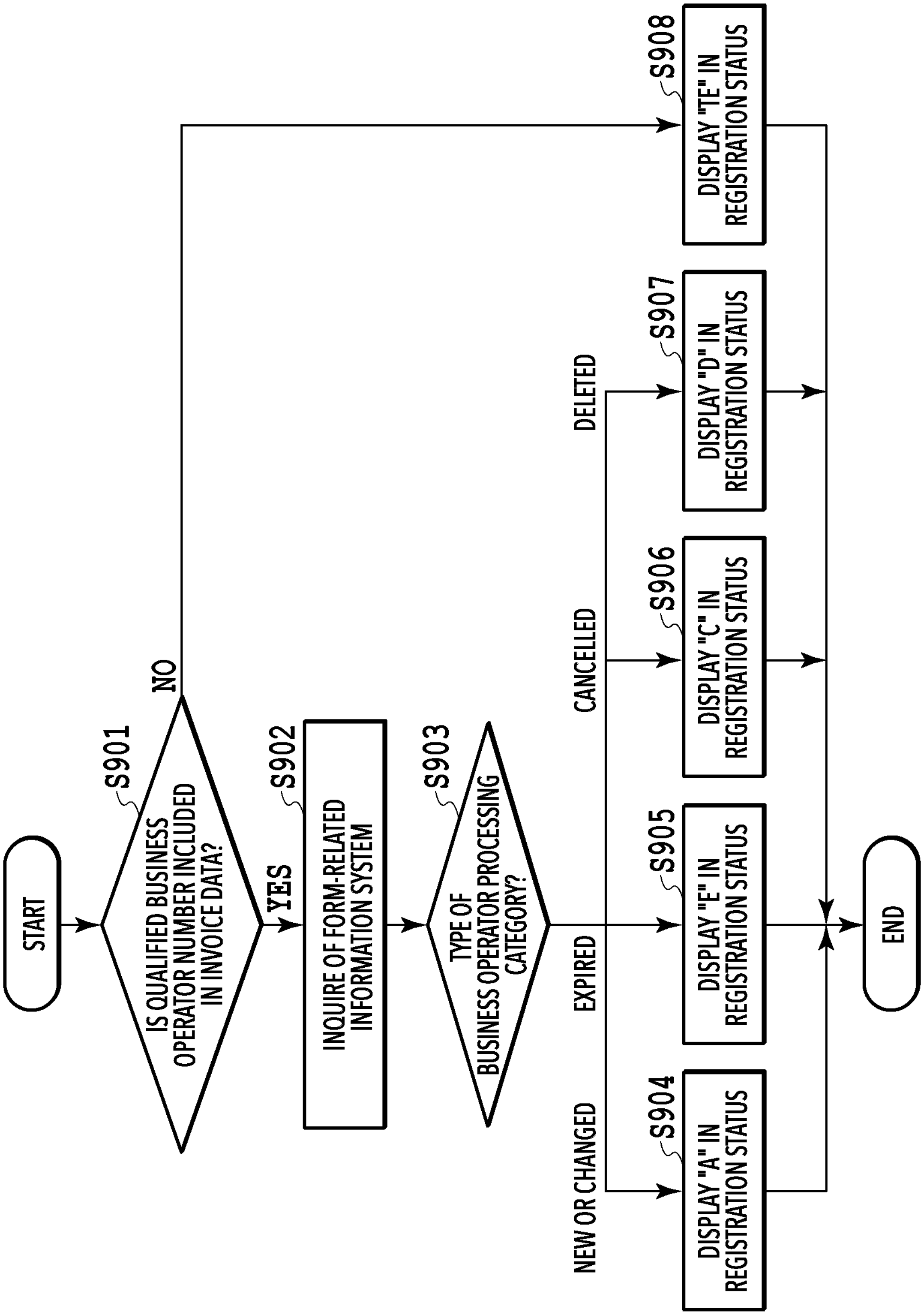
FIG. 9 is a flowchart showing a flow of display determination processing of a registration status.

FIG. 9 is a flowchart showing a flow of display processing of the registration status. Here, regarding the registration status, any one piece of information out of "A", "E", "C", "D", and "TE" corresponding to types of business operator processing categories is displayed in the registration status 823 on the journal entry screen 800.

In S901, the form management system 120 determines whether or not the qualified business operator number is included in the invoice data. In the case where it is determined that the qualified business operator number is not included (NO in S901), the processing proceeds to S908. In S908, the form management system 120 displays "TE", which represents a tax-exempt business operator, as the registration status. On the other hand, in the case where it is determined that the qualified business operator number is included (YES in S901), the processing proceeds to S902. In S902, the form management system 120 inquires of the form-related information system 140 about the processing category of the qualified business operator. The processing categories of the qualified business operator are categorized into new, changed, expired, cancelled, and deleted. The category "new" represents that the qualified business operator has been registered. The category "changed" represents that an address of the qualified business operator has been changed. The category "expired" represents that the qualified business operator has been expired. The category "cancelled" represents that the qualified business operator has been cancelled. The category "deleted" represents that the qualified business operator has been deleted.

In S903, the form management system 120 determines the type of the business operator processing category. In the case where it is determined that the business operator processing category is new or changed (new or changed in S903), the processing proceeds to S904. In S904, the form management system 120 displays "A" in the registration status. In the case where it is determined that the business operator processing category is expired (expired in S903), the processing proceeds to S905. In S905, the form management system 120 displays "E" in the registration status. In the case where it is determined that the business operator processing category is cancelled (cancelled in S903), the processing proceeds to S906. In S906, the form management system 120 displays "C" in the registration status. In the case where it is determined that the business operator processing category is deleted (deleted in S903), the processing proceeds to S907. In S907, the form management system 120 displays "D" in the registration status. Note that the flow shown in FIG. 9 will be terminated in the case where the processing in any of S904, S905, S906, S907, and S908 is completed.

Back to the explanation of the sequence diagram in FIG. 5, in S514, the invoice recipient terminal 110 displays the journal entry screen 800 as the input screen based on the image data for journal generation obtained in S513'. Then, the invoice recipient terminal 110 accepts input through the displayed journal entry screen 800 by the user operation of the person in charge at the business operator B for editing journal data such as creation, correction, and confirmation. Specifically, the person in charge at the business operator B carries out confirmation as to whether or not the contents of the invoice are in accordance with contents of the contract with the business operator A in terms of appropriateness of the items and the amounts on the invoice, and confirmation as to whether or not the amounts as well as the bank account details for remittance in the displayed invoice image data are the same as those of respective items on a payment request form. Then, journal entries are made for the invoice items in the case where there is no problem, and the "register journal" button 861 is pressed by the user operation. Thereafter, the person in charge at the business operator B presses the "execute payment" button 862 in S515. Accordingly, the invoice recipient terminal 110 executes the payment request to the form management system 120.

In S516, the form management system 120 instructs the core system 130 to perform the payment processing in accordance with the instruction from the invoice recipient terminal 110. In S516', the form management system 120 receives a result of payment from the core system 130 as a response to the instruction.

In S517, the form management system 120 stores the received result of payment in the data management unit 411. Then, in S517', the form management system 120 notifies the invoice recipient terminal 110 of completion of the payment processing. In S517'', the form management system 120 notifies the invoice issuer terminal 100 of completion of the payment processing. After completion of this notification, the processing shown in FIG. 5 will be terminated.

As described above, according to the present embodiment, it is possible to carry out the invoice processing while also including the information from the form-related information system 140 being the system other than the form management system 120 that creates the invoice. The form-related information obtained from the form-related information system 140 different from the form management system 120 is displayed together with the form information, so that a manual procedure such as the input of the form information by using the form management system can be reduced.

Incidentally, in the presence of an external management system configured to manage a registration number of a registered business operator by linking this information to related information that is related to the business operator such as a business operator name and a registration status of the business operator, there is a case where it is desirable to confirm a registration status such as whether or not a form issuer is registered with the relevant external management system. However, according to the technique of Japanese Patent Laid-Open No. 2022-091577, it is necessary to access the external management system, and to confirm the name of the form issuer and the registration status of the form issuer by using an identification number of the form issuer which is included in form information obtained from form image data.

According to the present embodiment, it is possible to obtain the registration information concerning the form issuer from a form image without carrying out the character recognition.

Although the case of displaying any of the five signs of "A", "E", "C", "D", and "TE" as the registration status of the qualified business operator has been described above, the present disclosure it not limited to this configuration. For example, each of "C", "E", and "D" represents the state where the qualified business operator number was previously issued and is currently invalid but the input tax credit under the invoice system cannot be applied. In this regard, "N" may be displayed instead of "C", "E", or "D" without distinguishing "C", "E", and "D".

Second Embodiment

In the present embodiment, an aspect of displaying an attention message corresponding to display contents of a registration status will be described with reference to a drawing. Note that the present embodiment will mainly describe different features from those of the first embodiment.

<Journal Entry Screen>

Figure 10:
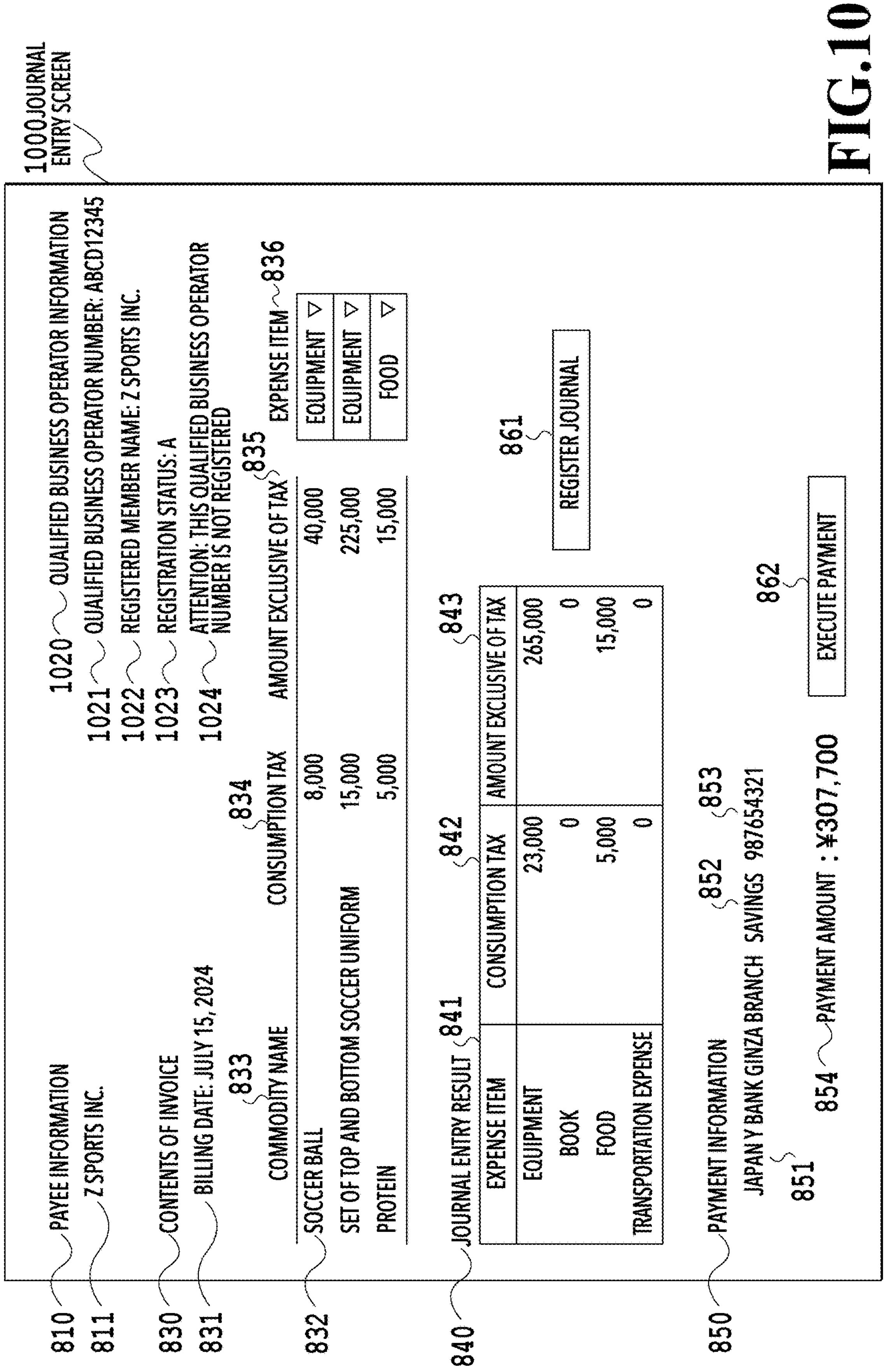
FIG. 10 is a schematic diagram showing a journal entry screen.

FIG. 10 is a diagram showing a journal entry screen according to the present embodiment. A journal entry screen 1000 is different from the journal entry screen 800 of the first embodiment in that an attention sentence is displayed below the registration status of the qualified business operator information. Specifically, the journal entry screen 1000 further includes qualified business operator information 1020 in addition to the payee information 810, the contents of invoice 830, the journal entry result 840, the payment information 850, the "register journal" button 861, and the "execute payment" button 862. The qualified business operator information 1020 includes a qualified business operator number 1021, a registered member name 1022, a registration status 1023, and an attention message 1024. It is to be noted, however, that the attention message 1024 is displayed in a case where "E", "C", "TE", "N" or the like is displayed in the registration status 1023.

In the present embodiment, a result of analysis acquired by obtaining the qualified business operator information including the processing category of the qualified business operator and analyzing the registration status as the qualified business operator based on the processing category of the qualified business operator, and an attention message associated with the result of analysis as appropriate are displayed in S512'.

An attention message such as "This qualified business operator number has been expired." may be displayed in a case where "E" is displayed as the registration status, for example. An attention message such as "This qualified business operator number has been cancelled." may be displayed in a case where "C" is displayed as the registration status, for example. An attention message such as "This qualified business operator number has been deleted." may be displayed in a case where "D" is displayed as the registration status, for example. An attention message such as "This business operator is a tax-exempt business operator and is not a qualified business operator." may be displayed in a case where "TE" is displayed as the registration status, for example. Meanwhile, an attention message such as "This business operator number is not registered." may be displayed in a case where "N" is displayed as the registration status, for example.

The display of the attention message can encourage the person in charge at the business operator B to confirm whether or not it is appropriate to proceed with journal entries and payment processing in accordance with the contents of the invoice. Upon receipt of this attention message, the person in charge at the business operator B performs the proper journal entries and the payment processing after confirming the situation with the business operator A and the like.

As described above, according to the present embodiment, it is possible to carry out the invoice processing that is more suitable for the qualified business operator system by additionally displaying the attention message in conformity to contents of the registration together with the registration status as the qualified business operator regarding the business operator A being the invoice issuer on the journal entry screen 1000.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

In addition, a system constructed by combining the features of the above-described embodiments as appropriate and functions thereof are also assumed to be encompassed by the technique of the present disclosure.

According to the present embodiment, it is possible to obtain the registration information on the issuer of the form from the form image without carrying out the character recognition.

While the present disclosure has been described with reference to embodiments, it is to be understood that the present disclosure is not limited to the disclosed embodiments. The scope of the following claims is to be accorded the broadest interpretation so as to encompass all such modifications and equivalent structures and functions.

This application claims the benefit of Japanese Patent Application No. 2024-201600, filed Nov. 19, 2024, which is hereby incorporated by reference herein in its entirety.

What is claimed is:

1. An information processing apparatus comprising:
at least one memory that stores instructions; and
at least one processor that executes the instructions to:
obtain a form image including a binary code corresponding to form identification information for identifying the form;
analyze the binary code included in the obtained form image;
obtain, based on the form identification information obtained by analyzing the binary code, form information associated with the form identification information, the form information including a registration number, the registration number including a character string indicating a qualified business operator number linked to a qualified business operator registered with an external apparatus that is capable of communicating with the information apparatus and stores a plurality of pieces of registration information on form issuers;
obtain, from the external apparatus, the registration information associated with the registration number included in the form information, the registration information including registration status information indicating a registration status; and
display, on a display unit, the form identification information, the registration information, and a message associated with the registration status information,
wherein, in a case where the registration status information is information representing that a form issuer corresponding to the registration number included in the form information is not registered with the external apparatus, the displayed message indicates that the form issuer is not registered with the external apparatus.

2. The information processing apparatus according to claim 1, wherein, in a case where the registration status information is information representing that registration of one of the form issuers indicated by the form identification information is expired, the displayed message indicates that the registration of the issuer is expired.

3. The information processing apparatus according to claim 1, wherein, in a case where the registration status information is information representing that registration of one of the form issuers indicated by the form identification information is cancelled, the displayed message indicates that the registration of the issuer is cancelled.

4. The information processing apparatus according to claim 1, wherein, in a case where the registration status information is information representing that one of the form issuers indicated by the form identification information is deleted from the external apparatus, the displayed message indicates that registration of the issuer is deleted from the external apparatus.

5. The information processing apparatus according to claim 1, wherein the at least processor further executes the instructions to:
output the form identification information and the registration information,
wherein the outputting involves, in a case where an instruction to output to the terminal apparatus is accepted, outputting the form identification information and the registration information to a terminal apparatus operated by a user.

6. The information processing apparatus according to claim 1, wherein the binary code is any of a barcode and a QR code.

7. The information processing apparatus according to claim 1, wherein the form image is an image obtained by scanning the form.

8. The information processing apparatus according to claim 1, wherein the registration information includes a character string indicating a name of the qualified business operator.

9. A method for controlling an information processing apparatus, the method comprising:
obtaining a form image including a binary code corresponding to form identification information for identifying the form;
analyzing the binary code included in the obtained form image;
obtaining, based on the form identification information obtained by analyzing the binary code, form information associated with the form identification information, the form information including a registration number, the registration number including a character string indicating a qualified business operator number linked to a qualified business operator registered with an external apparatus that is capable of communicating with the information apparatus and stores a plurality of pieces of registration information on form issuers;

obtaining, from the external apparatus, the registration information associated with the registration number included in the form information, the registration information including registration status information indicating a registration status; and displaying, on a display unit, the form identification information, the registration information, and a message associated with the registration status information, wherein, in a case where the registration status information is information representing that a form issuer corresponding to the registration number included in the form information is not registered with the external apparatus, the displayed message indicates that the form issuer is not registered with the external apparatus.

10. A non-transitory computer readable storage medium storing a program for causing a computer to perform a method for controlling an information processing apparatus, the method comprising:

obtaining a form image including a binary code corresponding to form identification information for identifying the form;

analyzing the binary code included in the obtained form image;

obtaining, based on the form identification information obtained by analyzing the binary code, form information associated with the form identification information, the form information including a registration number, the registration number including a character string indicating a qualified business operator number linked to a qualified business operator registered with an external apparatus that is capable of communicating with the information apparatus and stores a plurality of pieces of registration information on form issuers;

obtaining, from the external apparatus, the registration information associated with the registration number included in the form information, the registration information including registration status information indicating a registration status; and displaying, on a display unit, the form identification information, the registration information, and a message associated with the registration status information, wherein, in a case where the registration status information is information representing that a form issuer corresponding to the registration number included in the form information is not registered with the external apparatus, the displayed message indicates that the form issuer is not registered with the external apparatus.

* * * * *